July 6, 1943.    R. YATES    2,323,761
RESILIENT TIRE FOR WHEELS
Filed Sept. 5, 1942    3 Sheets-Sheet 1
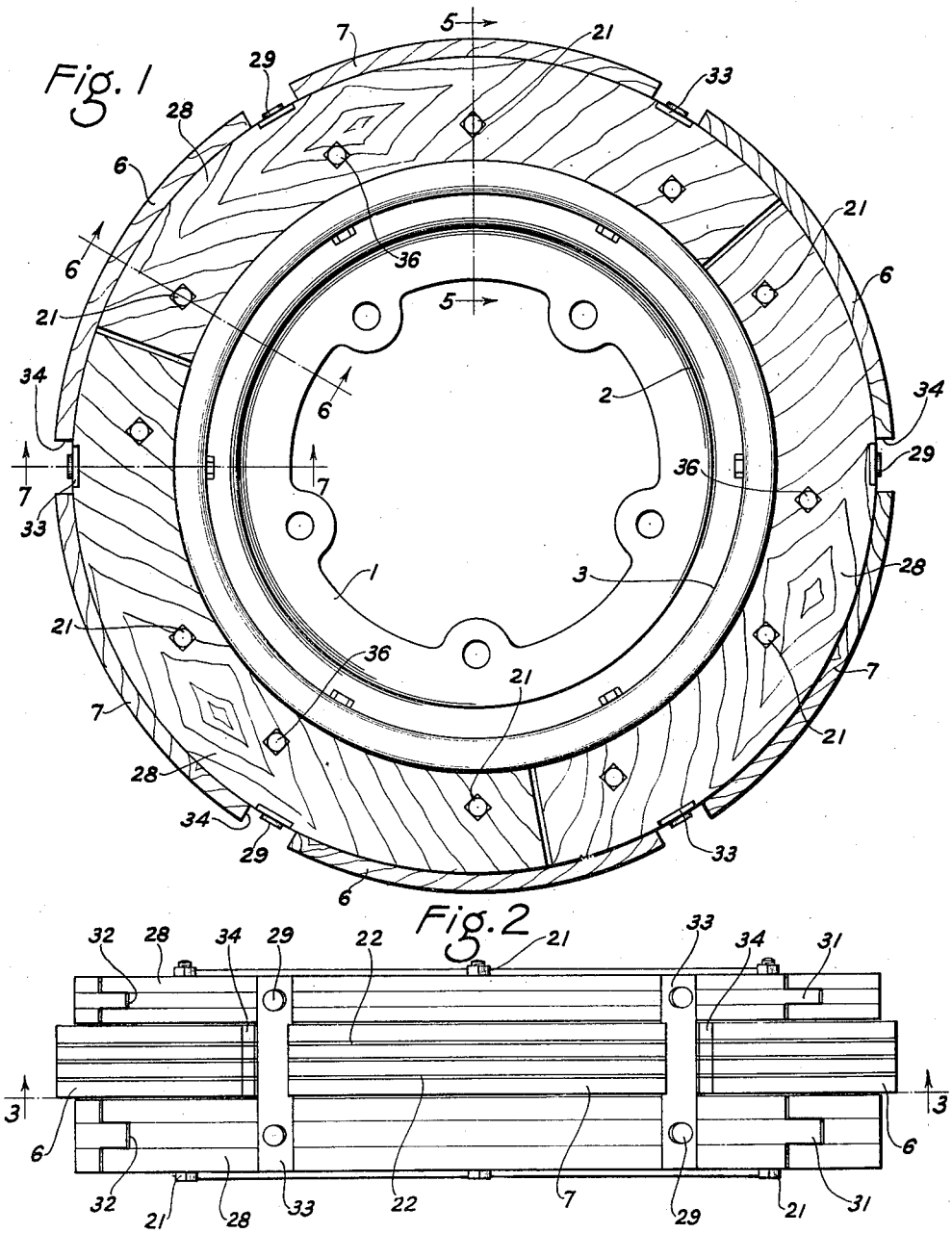
INVENTOR.
Richard Yates
BY Harold E. Stonebraker,
ATTORNEY.

July 6, 1943.    R. YATES    2,323,761
RESILIENT TIRE FOR WHEELS
Filed Sept. 5, 1942    3 Sheets-Sheet 2
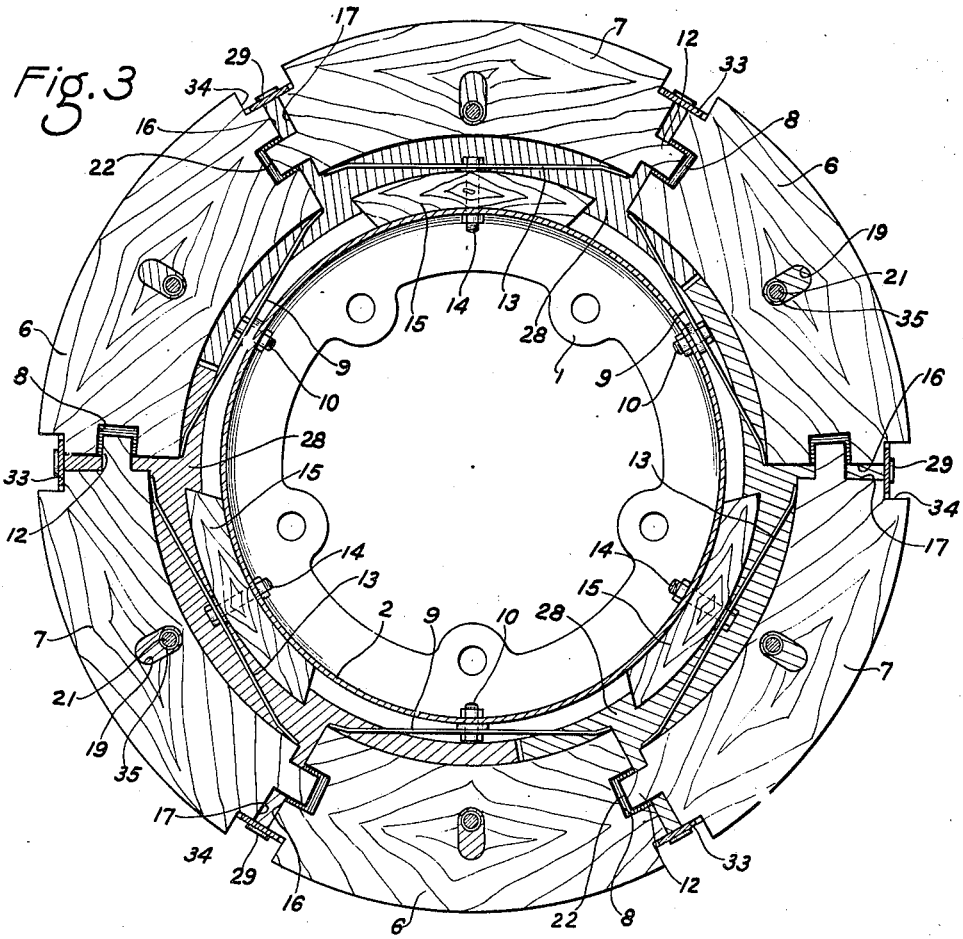
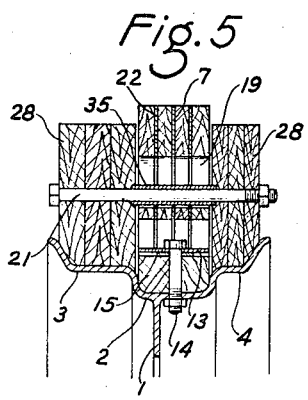
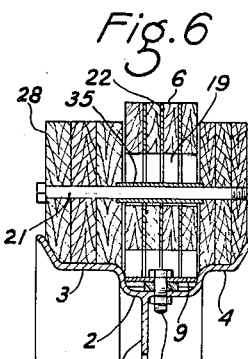
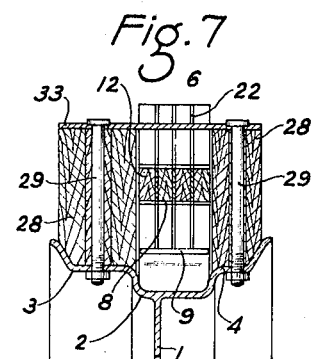
INVENTOR.
Richard Yates
BY Harold E. Stonebraker
ATTORNEY.

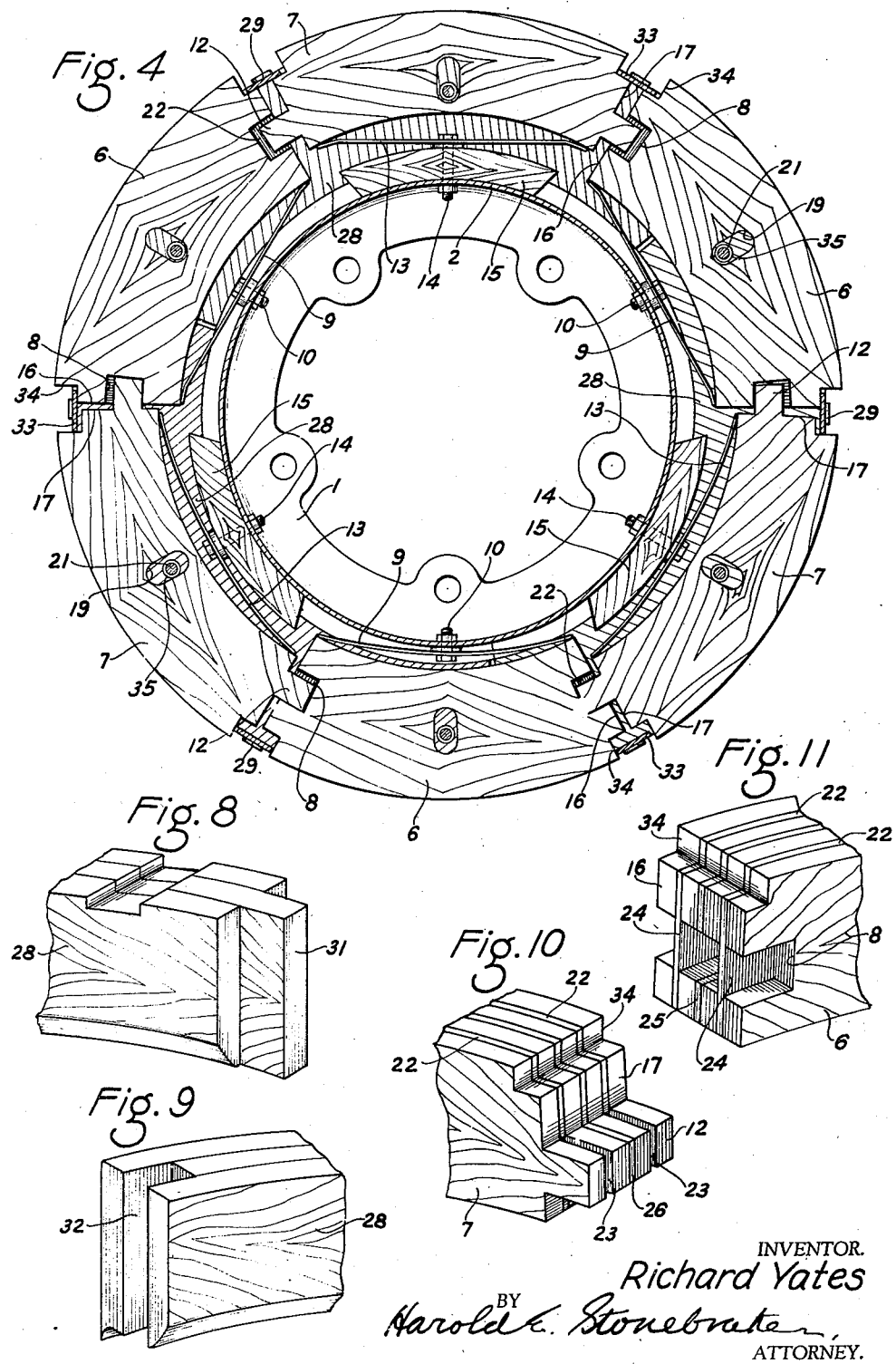

Patented July 6, 1943

2,323,761

UNITED STATES PATENT OFFICE 2,323,761

RESILIENT TIRE FOR WHEELS

Richard Yates, East Rochester, N. Y., assignor to Paul Folger, Rochester, N. Y.

Application September 5, 1942, Serial No. 457,406

9 Claims. (Cl. 152—255)

This invention relates to a resilient tire for wheels, and has for its object to afford a practical and efficient tire that does not require rubber in its make-up, is particularly adapted to trailer wheels, and is attachable to conventional metal rims.

A further purpose of the invention is to afford a construction that is economical to manufacture, easily serviced and repaired, and which is practical for use in conjunction with wheels of any type of automotive equipment.

An additional object of the invention is to afford a construction that can be manufactured chiefly from wood, which possesses satisfactory resiliency for all ordinary purposes, and which has sufficient wearing qualities to enable it to stand up under the friction and strain imposed by average road conditions.

More specifically, the invention is designed to afford a resilient tire composed of a series of radially yieldable spring-supported tread units that may be constructed principally of wood, which are independently removable and replaceable, and loosely interlocked with each other at their ends so as to cause a gradual and continuous radial movement of the tread with relation to the rim of the wheel as the latter turns on the ground.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation of a conventional wheel rim showing the application of a preferred embodiment of the invention;

Fig. 2 is a plan view or edge elevation of the same;

Fig. 3 is a vertical sectional view on the line 3—3 of Fig. 2 looking in the direction indicated and showing the tread units in their outermost positions;

Fig. 4 is a similar view showing the relation of the tread units when the lower part of the wheel is resting on the ground, the lowermost tread unit being moved upwardly and the adjacent tread units partially actuated thereby;

Fig. 5 is a transverse sectional view on line 5—5 of Fig. 1 looking in the direction indicated;

Fig. 6 is a similar sectional view on the line 6—6 of Fig. 1 looking in the direction indicated;

Fig. 7 is a similar sectional view on the line 7—7 of Fig. 1 looking in the direction indicated;

Fig. 8 is a detail perspective view of one end of one of the side wall sections;

Fig. 9 is a detail perspective view of the interlocking end of the adjacent side wall section;

Fig. 10 is a detail perspective view of one end of one of the tread units, and

Fig. 11 is a detail perspective view of the interlocking end of the adjacent tread unit.

Referring more particularly to the drawings in which like reference numerals throughout the several views refer to the same parts, the invention is shown applied to a conventional metal rim such as used on a trailer or other vehicle and including a web 1, a central portion 2 to which the resiliently supported and radially movable tread units are attached, while 3 and 4 designate the inner and outer portions of the rim to which the inner and outer side walls of the tire are fixedly secured.

The resilient tread that is supported on the central portion 2 of the rim includes a series of radially movable spring-supported segmental tread units such as shown at 6 and 7 respectively which are loosely interlocked in the following manner. Each tread unit 6 is provided with grooves or recesses 8 in its end walls and is supported at its ends on the ends of a leaf spring 9 that is attached to the central portion 2 of the rim by suitable fastening means such as a bolt 10.

Each alternate tread unit 7 is provided at its ends with tongues or projections 12 that fit loosely in the grooves or recesses 8 as shown, affording an interlocking connection, and is supported at its ends on a leaf spring 13 which is attached to the central portion 2 of the rim by fastening means such as a bolt 14, while 15 designates a block interposed between the springs 13 and the central portion 2 of the rim, as shown in Figs. 3 and 4.

Each alternate segmental tread unit 7 is cut away so that it is shorter and does not extend inwardly as far as the adjacent tread units 6, this difference being compensated by the blocks 15 upon which the tread units 7 are mounted. The object of this arrangement is to prevent wedging or sticking of the adjacent end walls of two adjacent tread units as they are moved inwardly when pressed against the ground and so that there is always a clearance between the end surfaces 16 of the tread units 6 and the adjacent shortened end surface 17 of the tread units 7, as shown in Fig. 4. At the same time, the loose interlocking connection between the adjacent tread units by reason of the tongues or projections 12 and the grooves or recesses 8 result in the lowermost tread unit when pressed inwardly, as shown in Fig. 4, carrying with it or actuating to a partial extent an adjacent tread unit 7, so that a continuous and gradual inward movement of the tread takes place as the wheel turns on the ground.

In order to guide the tread units during their radial movement, limit their movement, and maintain the proper relation between them, each tread unit is provided with a radially extending central slot 19 that is guided on a stationary transverse pin 21 that is supported by fixed side walls to be described presently. Each tread unit is preferably formed of wood and metal laminations, as shown in Figs. 10 and 11, and there are preferably four wood laminations between which are secured metal plates 22 so that the ground-engaging or tread surface of each unit is composed of four wooden layers alternating with three relatively thin metal plates, the several laminations being secured together in any suitable fashion by cement, bolts, or otherwise to afford an integral or unitary structure. In order further to guide the tread units in their radial movement and maintain proper relation between them, the outermost metal plates 22 are cut away or omitted between the wood laminations at the portions forming the tongues or projections 12, see Fig. 10, thus affording slots 23 which receive the portions 24 of the metal plates on the adjacent tread unit located in the groove or recess 8, the central metal plate 25 being cut away in the groove or recess 8 to afford a rectangular opening that receives the central portion of the tongue 12 including the two center wood laminations and the intermediate portion 26 of the metal plate between them, this same interlocking arrangement being duplicated between the ends of the several radially movable tread units.

For the purpose of limiting the sidewise movement of the tread units, and further to guide their radial movements, fixed side walls are provided which are attached to the rim and located adjacent to the tread units. Each side wall preferably includes three segmental sections designated at 28 and preferably formed of wood laminations. These segmental side wall sections are attached to the rim portions 3 and 4 respectively by means of suitable fastening means such as bolts 29 and have interlocking engagement with each other as for instance by means of a tongue 31 on the end of one side wall section engaging a groove 32 on the adjacent side wall section, and it will be observed that when the side wall sections are all attached, they afford a fixed channel in close relationship to the radially movable tread units and on both sides thereof for guiding the tread units as they move radially of the wheel.

The side wall sections terminate inwardly of the outermost surfaces of the tread units when the latter are in their outermost position, as shown in Fig. 1, so that most of the wear comes on the outer or tread surfaces of the tread units, the ends of which are spaced somewhat from each other as shown in Fig. 1 to permit the necessary radial movement. In order to cover the space between adjacent tread units and prevent entrance of dirt or the like therebetween, there are preferably employed cover plates such as shown at 33, see Fig. 2, which extend laterally over the side wall sections and are held in place thereon by the attaching bolts 29, see Fig. 7. These cover plates 33 are located in recesses formed between the cut away portions 34 at the ends of the tread units, and the opposite edges of the cover plates 33 are in reasonably close juxtarelation to the adjacent radial surfaces of the tread units so that as a tread unit is forced inwardly in a radial direction, its motion is guided by the edges of the fixed cover plates 33 which at the same time cover the space thereunder between the adjacent ends of the tread units and prevent the entrance of dirt into the recesses or pockets 8 that would otherwise retard or interfere with the proper free movement of the tread units.

The transverse pins or rods 21 which guide the tread units through the slots 19 are secured to the inner and outer side walls 28, as shown in Fig. 5, and are preferably provided at their central portions with a surrounding anti-friction sleeve or ferrule 35, while 36 designate fastening devices, such as bolts or otherwise, for holding together the laminations forming the several sections 28 of the fixed outer side walls.

With this construction, as the wheel turns in engagement with the ground, the lowermost tread unit is forced inwardly in a radial direction, as indicated in Fig. 4, moving inwardly to some extent the adjacent tread unit which reaches its innermost position when it comes into engagement with the ground. In this fashion the several tread units are successively moved inwardly by a continual and gradual motion that is controlled by the flexing of the springs 9 which return the tread units outwardly to their normal positions as released, and a true straight line radial movement of each tread unit is assured by the pin and slot guiding means acting in cooperation with the stationary side walls and the cover plates 33 engaging the adjacent end surfaces of the tread units.

Any particular tread unit or spring may be easily and quickly renewed if necessary by removing its guiding pin, and loosening the fastening means for an adjacent side wall section and the cover plates 33 at the ends of the particular tread unit, which can then be removed. The structure is economical to build, can be made entirely of wood and relatively low cost metal parts, and avoids the use of inflated units or other rubber parts.

While the invention has been described with reference to the particular construction shown, it is not confined to the present disclosure herein, and this application is intended to cover such modifications or departures as may come within the purposes of the improvement or the scope of the following claims.

I claim:

1. In a resilient tire, the combination with a rim, of a series of segmental radially movable tread units, a leaf spring for each tread unit secured to the rim and having its ends supporting the ends of the tread unit, the alternate tread units being of less depth than the adjacent ones, and a spacing block mounted between the rim and the leaf spring of each of said alternate tread units, and guiding means acting to control and limit the radial movement of each tread unit, the ends of each tread unit being interlocked with the adjacent tread units and acting to impart radial movement thereto.

2. In a resilient tire, the combination with a rim, of a series of segmental radially movable tread units, a leaf spring for each tread unit secured to the rim and having its ends supporting the ends of the tread unit, the alternate tread units being of less depth than the adjacent ones, and a spacing block mounted between the rim and the leaf spring of each of said alternate tread units, guiding means acting to control and limit the radial movement of each tread unit, the ends of each tread unit being interlocked with the adjacent tread units and acting to impart radial movement thereto, and fixed side walls secured to the rim and located adjacent to said tread units.

3. In a resilient tire, the combination with a rim, of a series of segmental radially movable tread units, a leaf spring supporting each tread unit and secured to the rim, side walls fixed to the rim and located adjacent to said tread units, each of said tread units having a radially extending slot, pins secured to the side walls extending through said slots and acting to guide the tread units and limit their radial motion, the adjacent tread units being provided with loose tongue and groove interlocking connections between their ends, and cover plates secured to the side walls and extending over the spaces between the ends of adjacent tread units 4. In a resilient tire, the combination with a rim, of a series of segmental radially movable tread units, a leaf spring supporting each tread unit and secured to the rim, side walls fixed to the rim and located adjacent to said tread units, each of said tread units having a radially extending slot therein, pins secured to the side walls extending through said slots and acting to guide the tread units and limit their radial motion, the adjacent tread units being provided with loose tongue and groove interlocking connections between their ends, and cover plates secured to the side walls and extending over the spaces between the ends of adjacent tread units, said side walls being composed of segmental sections formed of laminated wood and interlocked at their ends.

5. In a resilient tire, the combination with a rim, of a series of segmental radially movable tread units, and a leaf spring supporting each tread unit and secured to the rim, each tread unit consisting of wood and metal laminations and having loose tongue and groove connection at its ends with the adjacent tread units.

6. In a resilient tire, the combination with a rim, of a series of segmental radially movable tread units, and a leaf spring supporting each tread unit and secured to the rim, each tread unit consisting of laminations of wood and metal and adjacent tread units including a tongue at one end of one tread unit while the adjacent tread unit has a groove to receive said tongue loosely, the outer metal laminations including portions extending across said groove and the outer metal laminations on the adjacent tread unit being cut away between the wood laminations and affording slots to receive said metal lamination portions of the first mentioned tread unit.

7. In a resilient tire, the combination with a rim, of a series of segmental radially movable tread units, a leaf spring supporting each tread unit and secured to the rim, each tread unit consisting of wood and metal laminations and having loose tongue and groove connection at its ends with the adjacent tread units, and side walls formed of wood laminations fixedly secured to the rim and located adjacent to the tread units.

8. In a resilient tire, the combination with a rim, of a series of segmental radially movable tread units, a leaf spring supporting each tread unit and secured to the rim, each tread unit consisting of laminations of wood and metal and adjacent tread units including a tongue at one end of one tread unit while the adjacent tread unit has a groove to receive said tongue loosely, the outer metal laminations including portions extending across said groove and the outer metal laminations on the adjacent tread unit being cut away between the wood laminations and affording slots to receive said metal lamination portions of the first mentioned tread unit, and side walls formed of wood laminations fixedly secured to the rim and located adjacent to the tread units.

9. In a resilient tire, the combination with a rim, of a series of segmental radially movable tread units, a leaf spring extending under each tread unit perpendicular to its direction of radial movement, said leaf spring being secured at its center to the rim and having its ends supporting the ends of the tread unit, each tread unit consisting of wood and metal laminations, guiding means acting to control and limit radial movement of the tread units, and the ends of the tread units being loosely interlocked with the adjacent tread units and acting to impart radial movement thereto.

RICHARD YATES.